United States Patent [19]

Schurch

[11] 3,851,778
[45] Dec. 3, 1974

[54] TRANSPORT SYSTEM FOR GOODS CARRIERS

[75] Inventor: Eugen Schurch, Gerlafingen, Switzerland

[73] Assignee: Von Roll AG, Gerlafingen, Switzerland

[22] Filed: Feb. 8, 1973

[21] Appl. No.: 330,685

[30] Foreign Application Priority Data
Feb. 11, 1972   Switzerland.......................... 2003/72

[52] U.S. Cl...... 214/622, 214/16.1 C, 214/16.1 CE, 214/16.1 CF, 214/95 R
[51] Int. Cl............................................ B65g 1/06
[58] Field of Search............ 214/95 R, 89, 622, 623, 214/624, 625, 628, 16.1 C, 16.1 CE, 16.1 CF; 198/165, 163, 183

[56] References Cited
UNITED STATES PATENTS

| | | | |
|---|---|---|---|
| 1,487,573 | 3/1924 | Ingram................................. | 214/624 |
| 1,508,921 | 9/1924 | Castleman ........................... | 214/624 |
| 3,086,822 | 4/1963 | Fibish............................. | 198/33 AA |
| 3,197,020 | 7/1965 | Evans et al. ......................... | 198/183 |
| 3,380,602 | 4/1968 | Yanow.............................. | 214/95 R |
| 3,706,369 | 12/1972 | Ishida et al. ......................... | 198/165 |

*Primary Examiner*—Robert J. Spar
*Assistant Examiner*—Lawrence J. Oresky
*Attorney, Agent, or Firm*—Flynn & Frishauf

[57] ABSTRACT

A plurality of carrier units, adapted to hold goods, are placed at a connecting station along the path of a conveyor means, to be connected to a movable conveyor which is arranged to be selectively engageable with the carrier units. The connecting station is placed along the path of the conveyor to receive the transport units from the conveyor, or to hold units for loading on the conveyor. It essentially includes a pair of parallel spaced horizontally arranged storage and loading conveyors which extend at an angle, typically at right angles, to the main conveyor, the storage and loading conveyors being located above the floor surface, and the units are formed with laterally projecting brackets which extend from both sides to be supported by the storage and loading conveyor. The storage and loading conveyor preferably starts at an angle to form a ramp, to engage the brackets from beneath, and is formed of a roller chain, which has projecting rollers supported on a guide rail, or of a belt supported on a support way.

10 Claims, 8 Drawing Figures

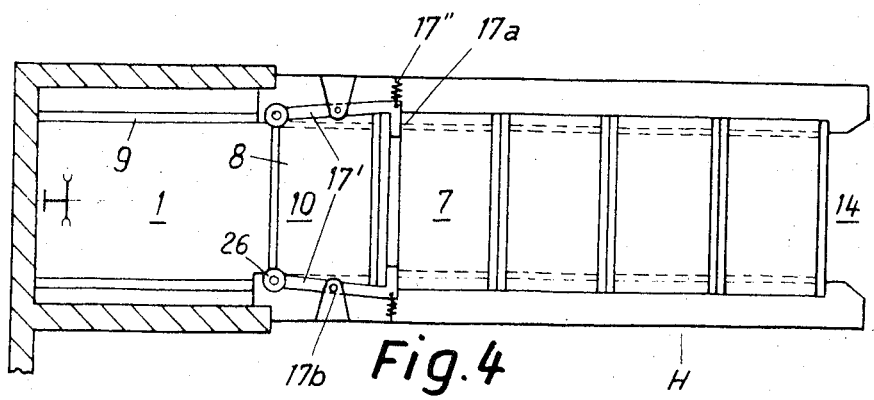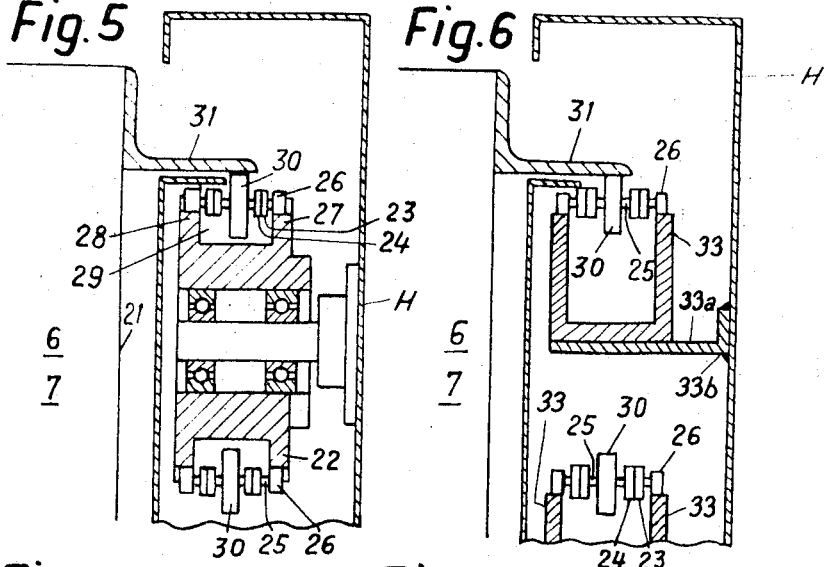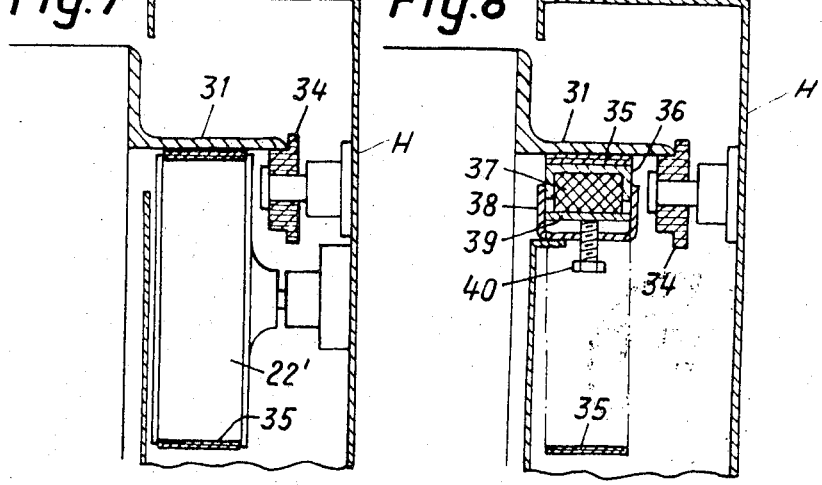

TRANSPORT SYSTEM FOR GOODS CARRIERS

The present invention relates to a transport system for goods carriers, and more particularly to such a transport system in which the main conveyor is arranged to carry the carrier units when suspended, and includes a gripper or similar arrangement to receive and hold the units.

Conveyor systems, particularly conveyor systems for vertical transport, or for reception of carrier units while the conveyor is in vertical direction are used in plants, warehouses, lofts, hospitals, and other public buildings. Goods are placed in carrier units which, in turn, are transported to desired locations. These carrier units may be in form of carrier baskets, bales, platforms, pallets, or the like and are well known. Various types of such carrier units are in commercial use. They are transported, as desired, from loading stations to the conveyor, and then to reception stations, entirely automatically and preferably without operator control upon loading. Automatic operation requires provision for storage of the units both at the loading as well as at the unloading stations, so that the units can be loaded on the conveyor in sequence, for example sequentially in a row. The transport units on the conveyor may be stopped at the reception and unloading stations, or may be continuously movable; a loading device is then provided in order to connect the carrier units to the main conveyor unit, that is, to transfer the units from the storage zone at the loading station to the conveyor and, at the unloading station, to transfer the units from the conveyor to the unloading storage zone.

The carrier units themselves are moved at the storage zone of the loading and unloading stations by means of rollers, auxiliary conveyors or other transport devices which usually are connected to the floor or support surface of the conveyor. Ordinarily, they are partially or entirely recessed within the floor surface. This has the disadvantage that change in arrangement or location of the loading and unloading stations is difficult; partly, or entirely recessing the loading and unloading stations into the floor surface requires removal of floor material which weakens the floor construction at a place where concentrated loads can be expected; alternatively, the floor surface has to be built up especially, or separately reinforced. The loading way itself may present a hazard to personnel walking in the region, due to recessed, or only partially recessed equipment.

It is an object of the present invention to provide a transport system with loading and unloading stations which is simple to install, and does not interfere with the weight-carrying capability of the floor surface, and does not require recessing of transport ways into the floor surface.

Subject matter of the present invention: Briefly, the connecting stations for loading and unloading of transport units comprises a pair of horizontally aligned spaced loading conveyors extending at an angle to the main transport conveyor, for example at right angle, and located above the support surface. The units themselves are formed with laterally projecting brackets which extend from both sides thereof and are located to be engaged from beneath by the loading conveyor to store the units, and move the units towards, or away from the main conveyor.

The construction permits the use of loading units of different size and does not require construction or connection to the floor which involves removal of floor material or recessing of components. The lower portion of the loading conveyors is not used for the loading function and may, for example, be equipped with wheels or other devices for further transport within the structure where the conveyor is located, and independently of the conveyor.

The connection stations, which may be loading as well as the unloading stations, are preferably so aligned that their free end terminates in a ramp, which facilitates the removal of units from the conveyor and hence from the connecting station, as well as insertion of units into the connecting station.

According to an embodiment of the invention, the spaced loading conveyors are roller chains, which have projecting rollers running on rails, so that the units which hang, with their brackets, between the conveyor roller chains are adequately supported. In accordance with another embodiment of the invention, the loading conveyor is a belt which is independently supported by a support guide way.

The invention will be described by way of example with reference to the accompanying drawings, wherein:

FIG. 4 is a top plan view of a connecting station, with an automatic stop lock;

FIG. 5 is a vertical sectional view of the loading conveyor along line V—V of FIG. 1;

FIG. 6 is a transverse sectional view along line VI—VI of FIG. 1;

FIG. 7 is a vertical sectional view of a different embodiment, taken along a section line similar to line V—V of FIG. 1; and FIG. 8 is a vertical sectional view similar to FIG. 6, but of the embodiment of FIG. 7.

Figure 1:
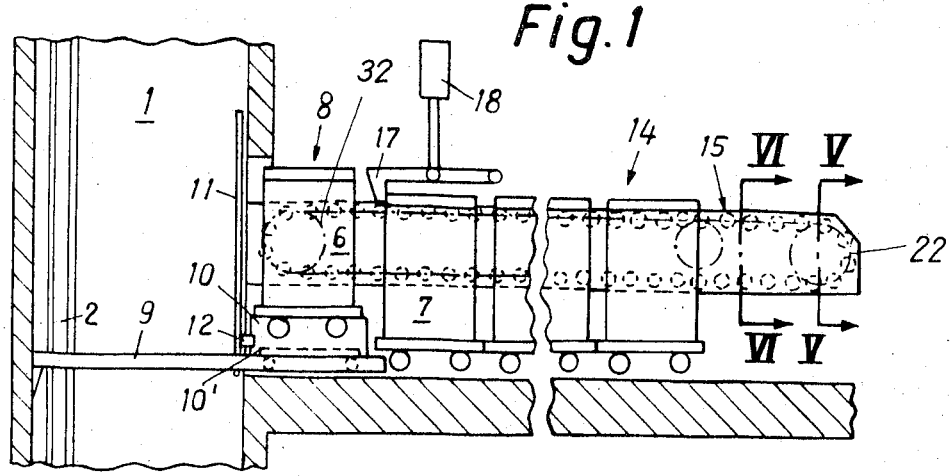
FIG. 1 is a highly schematic side view, partly in section, of a vertically operating main conveyor, and a loading station for transport units, before a conveyor carrier unit is in position to permit loading of a unit in the conveyor.
Figure 2:
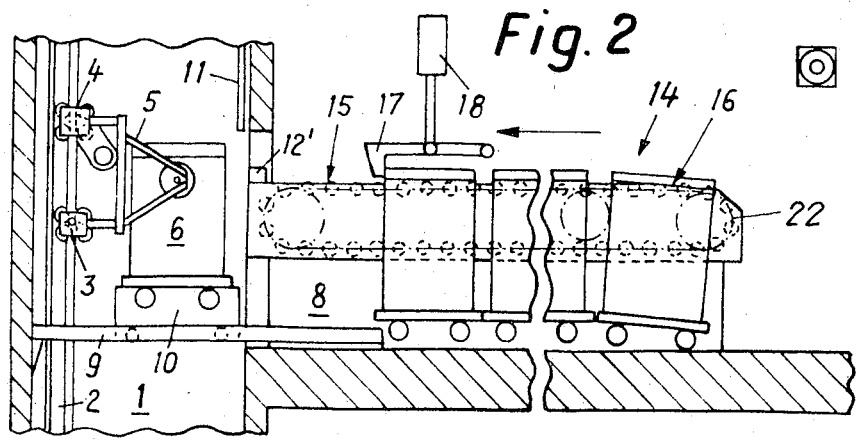
FIG. 2 is a view similar to FIG. 1 illustrating connection of a unit to the main conveyor.

FIGS. 1 and 2 illustrate a loading station where a carrier unit is to be connected to a suspension or elevator-type transport system. A shaft way 1 has a track or rail 2 located therein. The transport units include a pair of bogies 3, 4 (FIG. 2), which are arranged to run along tracks or rails 2. One or the other (or both) of the bogies 3, 4 include a drive motor which drives a cogwheel engaging a rack located between the track formed of rails 2 (and not shown for simplicity); other transport systems for the bogies 3, 4 may be used. The bogies are connected by a frame which includes a hanger 5, to which a carrier unit 6 can be attached.

FIG. 1 illustrates the instant at which a carrier unit 6 has been lifted by a lifting table 10 from the position indicated in broken line at 10' to the full line position. Table 10 can reciprocate on a track or rail system 9. Other loading systems may be used. FIG. 2 illustrates connection of a goods carrier unit 6 to the attachment system 5 of the main conveyor. The loading station itself is generally indicated at 8. The unit 6 is placed directly on the loading station 8, accepted by the table 10, and lifted. A door 11, with a lock 12 is unlatched, the door sliding vertically, to permit introduction of table 10, with the unit 6 thereon, to the main conveyor. Table 10 locates the unit 6 in position, so that when a transport bogy unit 3, 4, 5 arrives, it will securely latch to the carrier unit 6. The table 10, once in the shaft 1, may again be lowered, to permit attachment of a unit 6 to the attachment or connection system 5. Once the unit 6 is connected to system 5, table 10 retracts to the position outside of the shaft way. Door 11 can then close and the transport system of the main conveyor can move away from the loading position. The lock 12 on door 11 may additionally include a subsidiary lock 12', at the side of the door opening (or be replaced by the additional lock 12') which cooperates with a projecting bracket 31 (FIGS. 5-8) on the carrier units. As the carrier units are lifted, lock 12' is disabled, to permit, and control opening of door 11, so that door 11 will be opened only when the shaft way is blocked by a unit in position to be loaded.

The connecting station 14 provides loaded units for the main conveyor, or removes loaded units therefrom. The length of such a connecting station is defined by the length of a horizontal loading conveyor 15, which has two conveyor elements, located at both sides of the units 7, along the length of the loading conveyor 14, and at a predetermined level above the floor surface, as will be discussed in detail in connection with FIGS. 5-8. The horizontal loading conveyor 15 is slightly inclined downwardly at its free end to provide an inclined, or even horizontal ramp 16, for ease of introducing load units 7 to be stored by the loading conveyor. Upon introduction of a unit 7 on ramp 16, the unit 7 is automatically moved forwardly to the loading position, along the loading conveyor 14, until it can be accepted by the main conveyor.

A stop 17 is located immediately in advance of the loading station 8. Stop 17 can be disabled, for example by a lifting magnet 18, under electric control, when a unit has been loaded from station 8.

Figure 3:
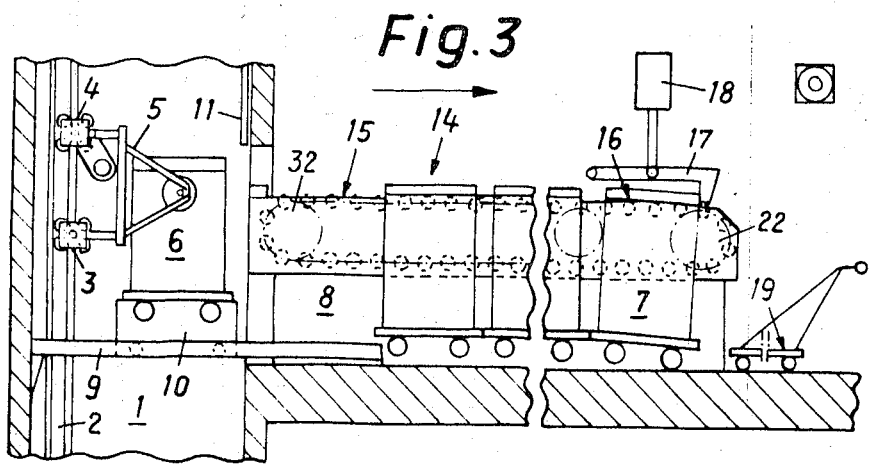
FIG. 3 is a view similar to FIG. 1 of a reception or unloading station, just before a unit which has been transported by the main conveyor is to be unloaded.

The receiving station illustrated in FIG. 3 is essentially similar to the loading station of FIGS. 1 and 2, and similar parts have been identified by similar reference numerals and will not be described again. The loading station 8 becomes the reception station, and the direction of transport of the loading conveyor is reversed, so that it becomes an unloading conveyor. The stops 17 are located at the end of the unloading station, rather than in advance of the loading gate. Shaft 1 can be located entirely differently from that at the loading station, and need not be the same shaft, but can be located anywhere along the transport line or transport path of the main conveyor. The shaft 1 need not be vertical, and the main conveyor need not operate in a vertical direction; the direction of the main conveyor path is not material. The load units themselves may be of differential size, equipped with wheels, or without wheels, the only requirement being that the ramp 16 be matched to the largest ones of the load units, or be suitably arranged in length and inclination to fit the units.

If a transport unit arrives at the unloading station to release a unit 6, gate 11 opens. Gate 11 opens only when the space 8 immediately adjacent the gate is free, so that a unit can be placed thereon. The main conveyor is preferably stopped during unloading. After opening of gate 11, table 10 is introduced on track 9 into the shaft way 1, is lifted in order to remove the unit 6 from the hanger 5 and is moved forwardly to the loading position 8 (which now becomes the unloading position), where table 10 is again lowered in order to permit unit 6 to engage the horizontal loading conveyor (which now becomes an unloading conveyor, by reversal of direction) to move the container 6 along the path of the unloading conveyor 14 towards ramp 16. The unit, now denoted 7 (that is, no longer in the main conveyor) can then be removed from ramp 16, as desired. Units without wheels can be loaded on dollies or carts 19.

Units 7 are released when the stop 17, located at the end of ramp 16 releases, that is, is lifted by lifting magnet 18.

The loading or unloading conveyor (hereinafter and in the claims for simplicity merely referred to as the loading conveyor) is generally enclosed in a housing H (FIGS. 5-8) which has been omitted from FIGS. 1-3 for clarity. FIG. 4 illustrates a self-controlled automatic stop 17', located at both sides along the storage conveyor path, and along the units 7. If a unit 7 is at the loading station 8, rollers 26 will be in the position shown, preventing further forward movement of units 7 towards the left. When a unit which is locked between the rollers 26 is lifted by table 10 and introduced into the shaft way 1, rollers 26 are first spread so that the arms 17' at the other end of their pivot point 17b will contract to positively prevent movement of any unit 7 towards the left, under action of the loading conveyor 14. After the unit on table 10 has been released, the springs 17'' will retract the catch ends 17a from the path of a next unit 7, which can be introduced to the left until again engaged by rollers 26. Pivots 17b can be located on suitable brackets.

Referring now to FIGS. 5 and 6: The auxiliary or horizontal loading (unloading) conveyor includes a roller chain having side plates 23, 24 connected by bolts 25, on which rollers 26 are rotatably journalled. Only one side, that is one half of the conveyor 15 is shown. A bracket 31 extends from a side walll 21 of carrier units 6, 7, the bracket 31 being guided above the roller chain 15. Roller chain 15 is guided about a sheave 22. Rollers 26 are engaged by two sprockets 27, 28 of sheave 22. The sprockets 27, 28 are separated by a gap 29. Rotatably journalled carrier rollers 13 are located on at least part of the bolts of chain 15. The carrier rollers 30 themselves engage the brackets 31 of the carrier units 6, 7. Since they are freely rotatable about bolts 25, the chain 15 can be driven while units 6, 7 are stationary.

The roller chain is further guided about a sheave 32. Either one, or both of sheaves 22, 32 are driven by a motor or other suitable drive means, not shown. A track or rail 33, which may be generally U-shaped, supports the roller chain between sheaves 22, 32, as seen in FIG. 6. The U-profile 33 is supported on cross braces 33a, welded at 33b to the housing H; other connections may also be used. The U-profile leaves a gap between the outer legs thereof to provide for free space and thus permit free rotation of the central support roller 30.

FIGS. 7 and 8 illustrate another embodiment of the horizontal storage conveyor. Bracket 31 is supported from beneath on a roller way having a series of rollers 34 secured to housing H. End sheave 22' carries a flexible belt 35 which is engaged between the sheave and the bracket 31 as a friction belt. A presser system is provided which includes a U-shaped track or guide 38 (FIG. 8) in which an elastic body 37 is inserted, pressed by means of a screw 40 acting on a plate 39 against the belt 35. A low-friction plate, for example a coated metal plate 36 is interposed between belt 35 and elastic body 37 to reduce friction between the belt and its resilient support.

Containers 6, 7 are supported at their opposite sides by the brackets 31 which, in turn, are supported by the conveyor 15, which may be a roller chain (FIGS. 5, 6), a series of support rollers and carrier belt (FIGS. 7, 8) or similar arrangement. The units are readily introduced to the main conveyor, or removed therefrom; the bottom of the units can be formed in any desired manner, for example to be loaded on pallets, loading platforms, or be provided with wheels.

The loading and unloading stations can be completely automatic, self-operated under control of the presence of units to be loaded, or can be controlled from a central control panel. Loading of units themselves, and unloading is completely automatic.

The stop systems 17, 18 (FIGS. 2, 3) can be located the path of the loading conveyor as desired; more than one such stop can be placed, in order to determine the position of the loading conveyors within the path, or to leave spaces free, for automatic loading and unloading from the main conveyor. One of the stops is preferably placed immediately in advance of the loading position to control placement of units to be loaded on the main conveyor. This permits tight packing of carrier units on the loading conveyor itself, without interfering with proper positioning of the single unit to be loaded on the main conveyor, to be released to the main conveyor, when a free angle unit 5 on the main conveyor is opposite the loading station. The carrier unit to be loaded is thereby always placed in suitable loading position, without crowding, although the remainder of the loading path can be packed for maximum space utilization. Movement of the carrier unit themselves, at the loading (unloading) conveyor is independent of movement of the loading conveyor. This permits continuous movement of the loading conveyor, without requiring special control equipment therefor. The carrier units may be equipped with wheels, or may be shaped for loading on pallets or other carts; the brackets themselves can be shaped to simultaneously function as hangers to be engaged by the attachment frame 5 of the main conveyor.

Various changes and modifications may be made within the scope of the inventive concept, and features described in connection with any one of the embodiments may equally be applied to other embodiments within the scope of the invention.

I claim:

1. Transport system for goods carriers, for installation, at least in part, on a support surface and having a plurality of carrier units (6, 7) adapted to hold goods to be transported and equipped with laterally projecting brackets (31) extending from the upper portions of both sides thereof, movable main conveyor means (1,2,3,4,5) and selectively engageable means on the carrier units and the main conveyor means to lock selected units to the main conveyor, and at least one loading station and at least one receiving station, said loading and receiving stations being of similar construction and readily convertible one into the other and, in each case, comprising:

a pair of parallel, spaced, horizontally arranged branch conveyors (15) extending at an angle from the main conveyor means and being located above the support surface, the length and spacing of said pair of branch conveyors defining respectively the length and width of an area available for storing carrier units of said plurality, the spacing between said pair being suitable for engagement of said brackets (31) of said carrier units (6,7) from beneath by said branch conveyors, both branch conveyors of said pair having at their ends farthest from said main conveyor respective ramp portions having a progressively depressed elevation over the level of said support surface, the ends of said branch conveyors of said pair nearest said main conveyor being located suitably for transfer of said carrier units between said main and branch conveyors;

drive means for continuously operating said branch conveyors in the direction determined by whether they are part of a loading station or of a receiving station, and restraining means (17,17') for holding at will at least one of said carriers (6,7) stationary while some part thereof is located between said branch conveyors and for allowing at will the continuously operating pair of branch conveyors to transport said at least one carrier, said branch conveyors being equipped with freely rotatable support roller means (30) for allowing said at least one carrier to be held stationary by said restraining means while supported by said conveyors, without interfering with the operation of said drive means, and means to transport said carrier units between said main conveyor and said branch conveyors.

2. System according to claim 1, wherein said loading station has a transfer space (9);

and the restraining means (17) thereof is located adjacent the main conveyor means and in advance of the transfer space (9).

3. System according to claim 1, wherein said receiving station has the restraining means (17) thereof located adjacent the end (16) of the pair of branch conveyors thereof which is remote from the main conveyor means.

4. System according to claim 1, wherein said pair of branch conveyors of said loading station has a carrier unit transfer space (9), and wherein a conveyor lock (12) is provided separating the main conveyor means and said pair of branch conveyors, the conveyor lock (12) isolating the carrier units on the transfer space from the main conveyor means until the main conveyor means is ready to accept a unit for transport.

5. System according to claim 4, wherein the conveyor lock (12') coacts with the brackets (31) on the carrier unit.

6. System according to claim 1, wherein each branch conveyor comprises a pair of end sheaves, a conveyor chain of the roller chain type (23, 24, 25, 26) and having carrier rollers (30) located thereon;

and track means (33) supporting the chain from beneath over at least a major portion of the length where the brackets (31) of the units bear on the chain.

7. System according to claim 6, wherein the chain comprises spaced, parallel plates (23, 24), cross pins

(25) connecting the plates for relative swinging movement of said plates, lateral roller means (26) located at the side of the plates and in position to be supported by said track means, and support roller means (30) having a greater diameter than the width of the plates and located for engagement by said brackets (31) on the carrier units (6,7), the support roller means (30) being rotatable on the cross pins (25) independently of the lateral roller means (26) to permit continuous operation of the chain over the track means even when the carrier units, engaged by the support roller means and located on the storage and transport conveyor, are stopped.

8. Transport system for goods carriers, for installation, at least in part, on a support surface having a plurality of carrier units (6,7) adapted to hold goods to be transported;

movable main conveyor means (1,2,3,4,5) and selectively engageable means on the carrier units and the main conveyor means to lock selected units to the main conveyor;

and a connecting station (14) located along the path of the main conveyor to receive transported units from the main conveyor or to hold units for loading on the main conveyor, comprising two parallel, spaced, horizontally arranged storage and transport conveyors (15) extending at an angle from the main conveyor means and being located above the support surface, the units (6,7) being formed with laterally projecting brackets (31) extending from both sides thereof and located to be engaged from beneath by said storage and loading conveyors for storage of the units and for movement of the units towards and away from the main conveyor means, each of the storage and transport conveyors comprising a pair of roller support ways (34) located beneath the brackets (31) of the units to support the units; and a transport belt (35) in resilient frictional engagement with the brackets of the units.

9. System according to claim 1, wherein the main conveyor means is a suspension type transport system equipped with a plurality of suspension carriage means each of which is provided with hanger means (5) arranged to be engageable with one of the carrier units (6,7) for suspending it, each of said suspension carriage means being arranged to run on a guide track (2); and wherein, further, the brackets (31) of the carrier units are formed to be engaged by said hanger means (5).

10. System according to claim 1, wherein the main conveyor means is movable over an essentially vertically extending conveyor path, and said angle is approximately a right angle between horizontal and vertical directions.

* * * * *